INVENTOR.
TAKASHI NAKAMURA
BY
Wolfe, Hubbard, Voit & Osann
ATTYS.

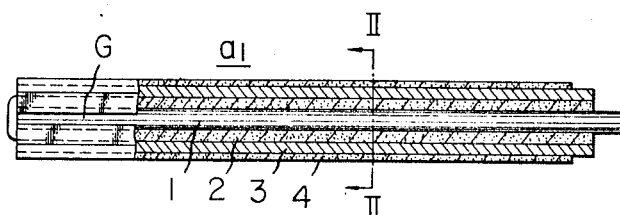
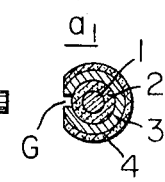
Fig. 1  Fig. 2
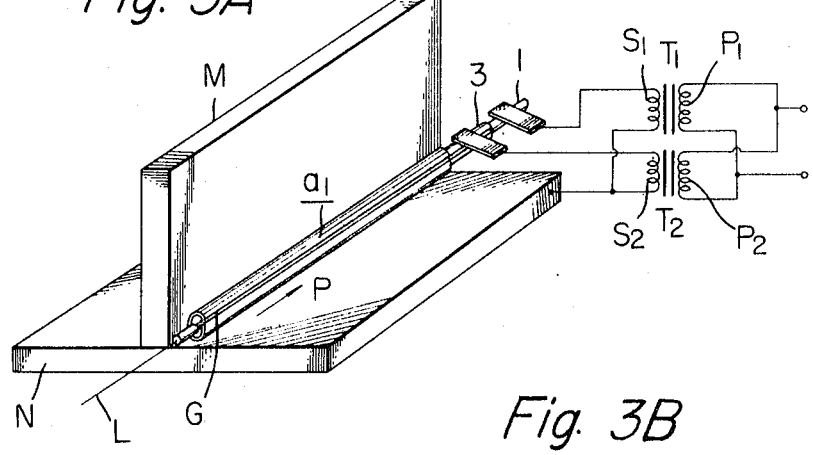
Fig. 3A
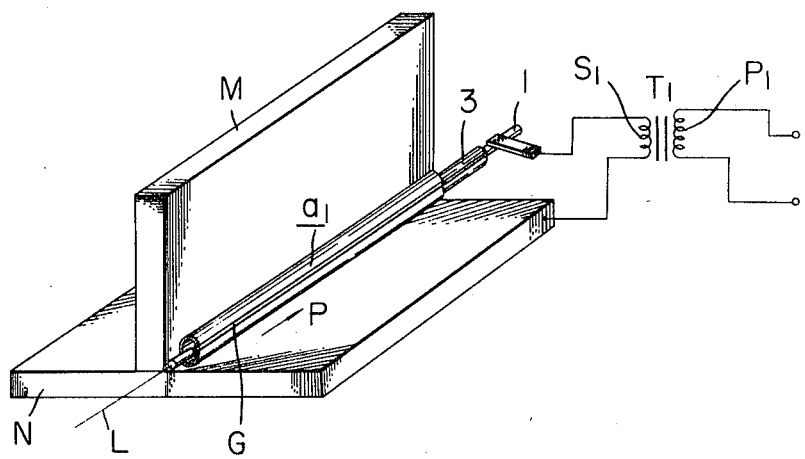
Fig. 3B
INVENTOR.
TAKASHI NAKAMURA June 2, 1970  TAKESHI NAKAMURA  3,515,846
ARC-WELDING ELECTRODES AND WELDING METHOD USING THE SAME
Filed Sept. 8, 1967  3 Sheets-Sheet 2

United States Patent Office 3,515,846
Patented June 2, 1970

3,515,846
ARC-WELDING ELECTRODES AND WELDING
METHOD USING THE SAME
Takeshi Nakamura, Osaka, Japan, assignor to Bankoh
Denkyokubo Kabushiki Kaisha, Osaka, Japan, a corporation of Japan
Filed Sept. 8, 1967, Ser. No. 666,255
Claims priority, application Japan, Mar. 22, 1967,
42/17,814
Int. Cl. B23k 9/00
U.S. Cl. 219—137
8 Claims

ABSTRACT OF THE DISCLOSURE

An arc welding electrode having a wire core of conventional welding metal and a coating of conventional electrical insulating material around the wire core. The insulating coating is covered by a tube of material capable of being magnetized when an electric current is passed through the wire core, and this tube has a continuous narrow longitudinal opening for varying the magnetic flux density around the wire core to bias the welding arc.

---

This invention relates to improvements in arc-welding electrodes and welding or surface building up methods.

In welding or surface building up with a conventional arc-welding electrode, it has been so difficult to concentrate arcs in the parts to be welded or surface built up that it has been substantially impossible to make a uniform favorable welding or surface building up.

An object of the present invention is to provide an arc-welding electrode and a welding or surface building up method with said welding electrode whereby a uniform favorable welding or surface building up can be positively made by strongly concentrating arcs in a part of the peripheral surface of the welding electrode.

Other objects and advantages of the present invention will be made clear upon reading the following descriptions with reference to the drawings in which:

FIG. 1 is a partly sectioned plan view of the first embodiment of the arc-welding electrode of the present invention;

FIG. 2 is a cross-sectioned view on line II—II in FIG. 1;

FIGS. 3A, 3B and 4 are explanatory views of a welding method with the welding electrode of the embodiment shown in FIG. 1;

Figure 4:
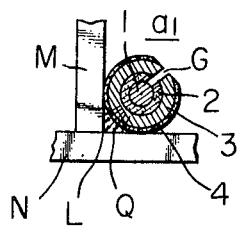

It should be understood that, although the preferable embodiments of the present invention are explained, the present invention is not to be limited to the specific embodiments shown herein but is rather to include all equivalent arrangements and various modifications to be included in the claims and the spirit of the invention.

Referring now to the drawings, in FIGS. 1 and 2 showing the first embodiment of the arc-welding electrode of the present invention, 1 is an inner core wire made of iron, copper or any other metal, 2 is an inner coating material coating the outer periphery of said inner core wire and made, for example, of feldspar, limestone or a ferro-alloy, 3 is an outer core tube covering the outer periphery of said coating material, made of iron, copper or any other metal and provided with a narrow long axial opening G in a part of its periphery and 4 is an outer coating material coating the outer periphery of said outer core tube 3 except the above mentioned opening G and made of feldspar, limestone, graphite or rutile.

In carrying out the welding by using the arc-welding electrode $a_1$ shown in FIGS. 1 and 2, said welding electrode $a_1$ is arranged, as shown, for example, in FIG. 3A, along a welding line L of metal plates M and N to be welded and the narrow long opening G in the axial direction of the welding electrode $a_1$ is positioned on the other side of the welding line L. Then, the inner core wire 1 and outer core tube 3 of said welding electrode $a_1$ are connected to the same poles of the respective secondary windings $S_1$ and $S_2$ of transformers $T_1$ and $T_2$ and the other poles of the secondary windings $S_1$ and $S_2$ are connected in common to the metal plates M and N to be welded. Then, if the primary windings $P_1$ and $P_2$ of both transformers $T_1$ and $T_2$ are connected to an electric source, the welding electrode $a_1$ will gradually melt in the direction indicated by the arrow P from its tip and the metal plates M and N to be welded will be automatically gradually welded along the welding line L. In such case, as shown by the arrows Q in FIG. 4, arcs generated from the welding electrode $a_1$ will be concentrated on the outer peripheral surface on the other side of the axial opening G of the welding electrode $a_1$ according to Fleming's rule due to the magnetic field produced from its outer core tube 3 and a welding having a proper melt-in and a uniform bead appearance will be made along the welding line L of the metal plates M and N to be welded. Further, as shown in FIG. 3B, an electric current may be passed only through the inner core wire 1 of the welding electrode in the present invention.

Figure 5:
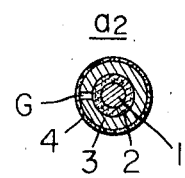
FIG. 5 is a cross-sectioned view of the second embodiment of the welding electrode of the present invention.

In FIGS. 5, $a_2$ shows the second embodiment of the arc-welding electrode of the present invention. The welding electrode $a_2$ shown in FIG. 5 is different from the first embodiment shown in FIGS. 1 and 2 in that the entire outer peripheral surface of the outer core tube 3 is coated with the outer coating material 4 but its operation and effect are exactly the same as those of the above mentioned first embodiment. Just in the welding electrode $a_2$ of this second embodiment, as the entire outer peripheral surface is coated perfectly with the outer coating material 4, the appearance is favorable and the production is easy. However, the welding electrode $a_2$ of said second embodiment, as the opening G can not be seen from outside, it is preferable to draw a line of a color easy to see on the surface of the outer coating material 4 along said opening G.

Figure 6:
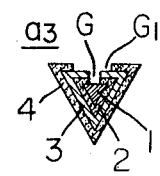
FIG. 6 is a cross-sectioned view of the third embodiment of the welding electrode of the present invention.
Figure 7:
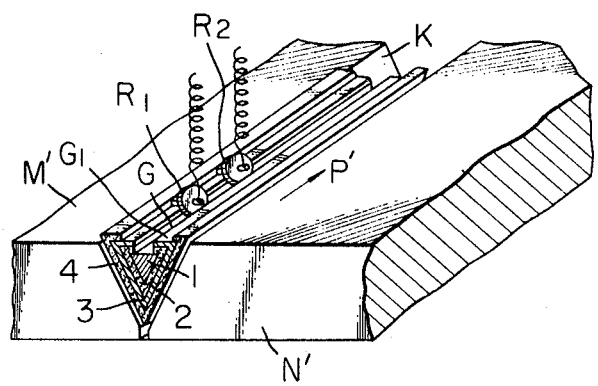
FIGS. 7 and 8 are explanatory views of a welding method with the welding electrode of the embodiment shown in FIG. 6.
Figure 8:
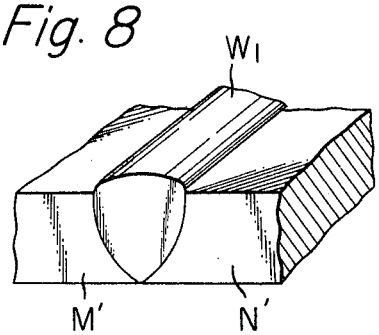

The welding electrode $a_3$ of the third embodiment shown in FIG. 6 is different from the structures described above in that its cross-section is made triangular but its operation and effect are substantially the same as those of the above mentioned first embodiment. Just, as shown in FIG. 7, the one of the third embodiment is adapted to be used to weld metal plates M' and N' in which the cross-section of the clearance K between the surfaces to be welded is triangular, because, as both of the crosssections of the welding electrode $a_3$ and that of the clearance K between the surfaces to be welded of the metal plates M' and N' are triangular, at the time of welding, the welding electrode $a_3$ will reach the deep part of the clearance K and a sufficient welding effect will be able to be given far into the deep part. Further, in FIG. 7, it is shown that rollers $R_1$ and $R_2$ made of a conductor are used to lead an electric current to the inner core wire 1 and outer core tube 3, respectively, so that said rollers $R_1$ and $R_2$ may be moved in the direction indicated by the arrow P' while in contact with the inner core wire 1 and outer core tube 3 in the openings G and $G_1$, respectively, in welding the metal plates M' and N'. Such method of feeding electricity can be, of course, adopted also in the other embodiments. By the way, $W_1$ in FIG. 8 shows the state of the part welded by the method shown in FIG. 7.

Figure 9:
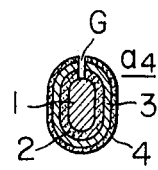
FIG. 9 is a cross-sectioned view of the fourth embodiment of the welding electrode of the present invention.
Figure 10:
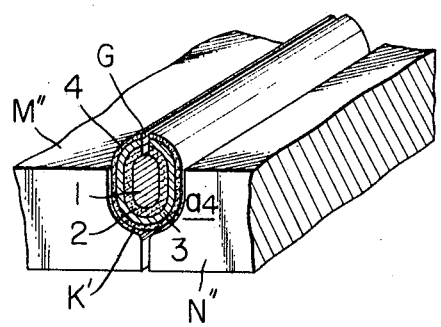
FIGS. 10 and 11 are explanatory views of a welding method with the welding electrode of the embodiment shown in FIG. 9.
Figure 11:
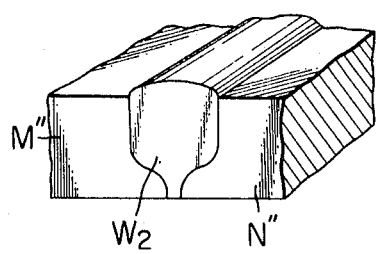

In FIG. 9, $a_4$ shows the welding electrode of the fourth embodiment of the present invention. This welding electrode $a_4$ is of an elliptic cross-section and is therefore adapted to be used to weld metal plates M'' and N'' in which the cross-seection of the clearance K' between the surfaces to be welded is semi-elliptic as shown in FIG. 10. The reason therefor is the same as is explained with reference to the above mentioned third embodiment. FIG. 11 shows the state of the part $W_2$ welded by the method shown in FIG. 10 by using the welding electrode $a_4$ of the fourth embodiment shown in FIG. 9.

Figure 12:
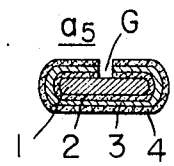
FIG. 12 is a cross-sectioned view of the fifth embodiment of the welding electrode of the present invention.
Figure 13:
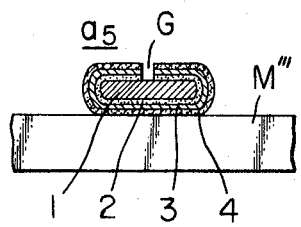
FIGS. 13 and 14 are explanatory views of a surface building up method with the welding electrode of the embodiment shown in FIG. 12.
Figure 14:
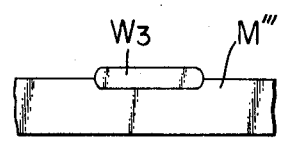

In FIG. 12, $a_5$ shows the welding electrode of the fifth embodiment of the present invention to be used in building up the surface of a metal plate. In building up the surface of a metal plate M''' as shown in FIG. 13 by using this welding electrode $a_5$, the welding electrode $a_5$ is kept in contact with the surface of the metal plate M''' and an electric current is passed through its inner core wire 1 and outer core tube 3. Thus arcs will be concentrated between the surface on the other side of the opening G of the welding electrode $a_5$ and the surface of the metal plate M''' and such surface building up as is shown by $W_3$ in FIG. 14 will be produced in this part. The width of this surface building up $W_3$ can be easily adjusted by varying the width of the opening G of the welding electrode $a_5$. Further, in the present invention, the coating material 4 coating the outer periphery of the outer core tube 3 may be omitted.

In the arc-welding electrode of the present invention, as a narrow long axial opening is made in the outer core tube, arcs can be strongly concentrated on the other side of the above mentioned opening on the peripheral surface of this welding electrode and therefore its welding effect or surface building up effect can be extremely increased. Further, by varying the width of the above mentioned opening, the width of the welded part or surface built up part can be freely varied. Further, by merely placing this welding electrode on the welding line or surface building up line of the things to be welded or built up, without moving the welding electrode, a long welded part or surface built up part can be continuously and automatically made.

What is claimed is:

1. An arc-welding electrode comprising a central wire core of welding metal, a coating of electrically insulating material disposed around said central wire core, and an outer core tube covering the outer periphery of said coating material, said outer core tube consisting essentially of a magnetic material capable of being magnetized in response to an electric current passed through said inner core wire and being provided with a continuous narrow long opening in its axial direction for varying the peripheral magnetic flux density around said wire to bias the welding arc.

2. An arc-welding electrode according to claim 1, wherein said outer core tube is provided with an outer coating material on the surface.

3. An arc-welding electrode according to claim 2, wherein said outer coating material is provided with a continuous narrow long opening in its axial direction and said opening is on the opening made in the outer core tube.

4. An arc-welding electrode according to claim 1, wherein the cross-section of the electrode is triangular and said opening is made in the axial direction on one side of the triangle.

5. An arc-welding electrode according to claim 1, wherein the cross-section of the electrode is elliptic and said opening is made in parallel with the axis.

6. An arc-welding method comprising the steps of positioning longitudinally adjacent a pair of elongated surfaces to be welded, an elongated arc-welding electrode comprising a central wire core of welding metal, a coating of electrically insulating material disposed around said central wire core, and a layer of magnetic material disposed around said coating for producing a magnetic field in response to an electrical current passed through said central wire core, applying an electric voltage across said wire core and one of said surfaces to be welded so as to pass an electric current longitudinally through said wire core to produce a welding arc between said wire core and said surface to be welded, said layer of magnetic material forming a continuous longitudinal opening extending along the length thereof parallel to the axis of said wire core for varying the peripheral magnetic flux density around said electrode to bias the welding arc in a predetermined direction, said longitudinal opening being disposed on the opposite side of said electrode from said surfaces to be welded.

7. An arc-welding method as set forth in claim 6 wherein an electric voltage of the same phase is applied between the surface to be welded and said central wire and between said surface and said layer of magnetic material.

8. A surface building up method comprising the steps of positioning longitudinally adjacent a selected surface to be built up, an elongated arc-welding electrode comprising a central wire core, a coating of electrically insulating material disposed around said central wire core, and a layer of magnetic material disposed around said coating for producing a magnetic field in response to an electrical current passed through said central wire core, applying an electric voltage across said wire core and said surface, for passing an electric current longitudinally through said wire core to produce a welding arc between said wire core and said surface, said layer of magnetic material forming a continuous longitudinal opening extending along the length thereof parallel to the axis of said wire core for varying the peripheral magnetic flux density around said electrode to bias the welding arc in a predetermined direction, said longitudinal opening being disposed on the opposite side of said electrode from said surface.

References Cited
UNITED STATES PATENTS

| | | | |
|---|---|---|---|
| 1,643,254 | 9/1927 | Miller | 219—146 |
| 1,778,392 | 10/1930 | Kinkead | 219—146 X |
| 2,379,777 | 7/1945 | Zeilstra | 219—137 X |
| 2,410,461 | 11/1946 | Ronay | 219—146 |
| 2,587,195 | 2/1952 | Moerman | 219—137 |

ANTHONY BARTIS, Primary Examiner

C. L. ALBRITTON, Assistant Examiner

U.S. Cl. X.R.

219—145